US008004852B2

(12) United States Patent
Takeguchi et al.

(10) Patent No.: US 8,004,852 B2
(45) Date of Patent: Aug. 23, 2011

(54) ELECTRONIC APPARATUS

(75) Inventors: Koichiro Takeguchi, Hachioji (JP); Shigeo Hayashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 545 days.

(21) Appl. No.: 12/199,628

(22) Filed: Aug. 27, 2008

(65) Prior Publication Data
US 2009/0168378 A1 Jul. 2, 2009

(30) Foreign Application Priority Data

Dec. 28, 2007 (JP) ................ 2007-339539

(51) Int. Cl.
*H05K 7/00* (2006.01)
(52) U.S. Cl. ...................................... 361/760
(58) Field of Classification Search .............. 361/760
See application file for complete search history.

(56) References Cited

U.S. PATENT DOCUMENTS

| 7,482,800 | B2 * | 1/2009 | Ooyabu et al. | 324/756.07 |
|---|---|---|---|---|
| 7,535,724 | B2 * | 5/2009 | Tan | 361/760 |
| 2007/0279879 | A1 * | 12/2007 | Fujii | 361/760 |
| 2008/0007926 | A1 * | 1/2008 | Lee et al. | 361/760 |
| 2009/0109640 | A1 * | 4/2009 | Hsiung et al. | 361/760 |
| 2010/0079964 | A1 * | 4/2010 | Sewald et al. | 361/760 |

FOREIGN PATENT DOCUMENTS

| JP | 62-117396 | 5/1987 |
|---|---|---|
| JP | U 02-30678 | 2/1990 |
| JP | 04-015990 | 1/1992 |
| JP | U 3057770 | 3/1999 |
| JP | 2000-323216 | 11/2000 |
| JP | 2005-050619 | 2/2005 |

OTHER PUBLICATIONS

Notification of Reason for Refusal issued by Japan Patent Office on Feb. 17, 2009.
Notification of Reason for Refusal issued by Japan Patent Office on Aug. 4, 2009.

* cited by examiner

*Primary Examiner* — Lisa Lea-Edmonds
(74) *Attorney, Agent, or Firm* — Knobbe, Martens, Olson & Bear LLP

(57) ABSTRACT

According to an aspect of the present invention, there is provided an electronic apparatus including: a wiring that is formed on a mounting surface; a terminal that is electrically connected with the wiring; a terminal holder that is disposed above the mounting surface to face the wiring and that holds the terminal in a space between the terminal; and a blocking member that is disposed on the terminal holder at a side facing the mounting surface, that surrounds the terminal and that is separated from the mounting surface to regulate a gap between blocking member and the mounting surface so that the terminal is prevented from passing therethrough when the terminal is broken off from the terminal holder.

10 Claims, 16 Drawing Sheets

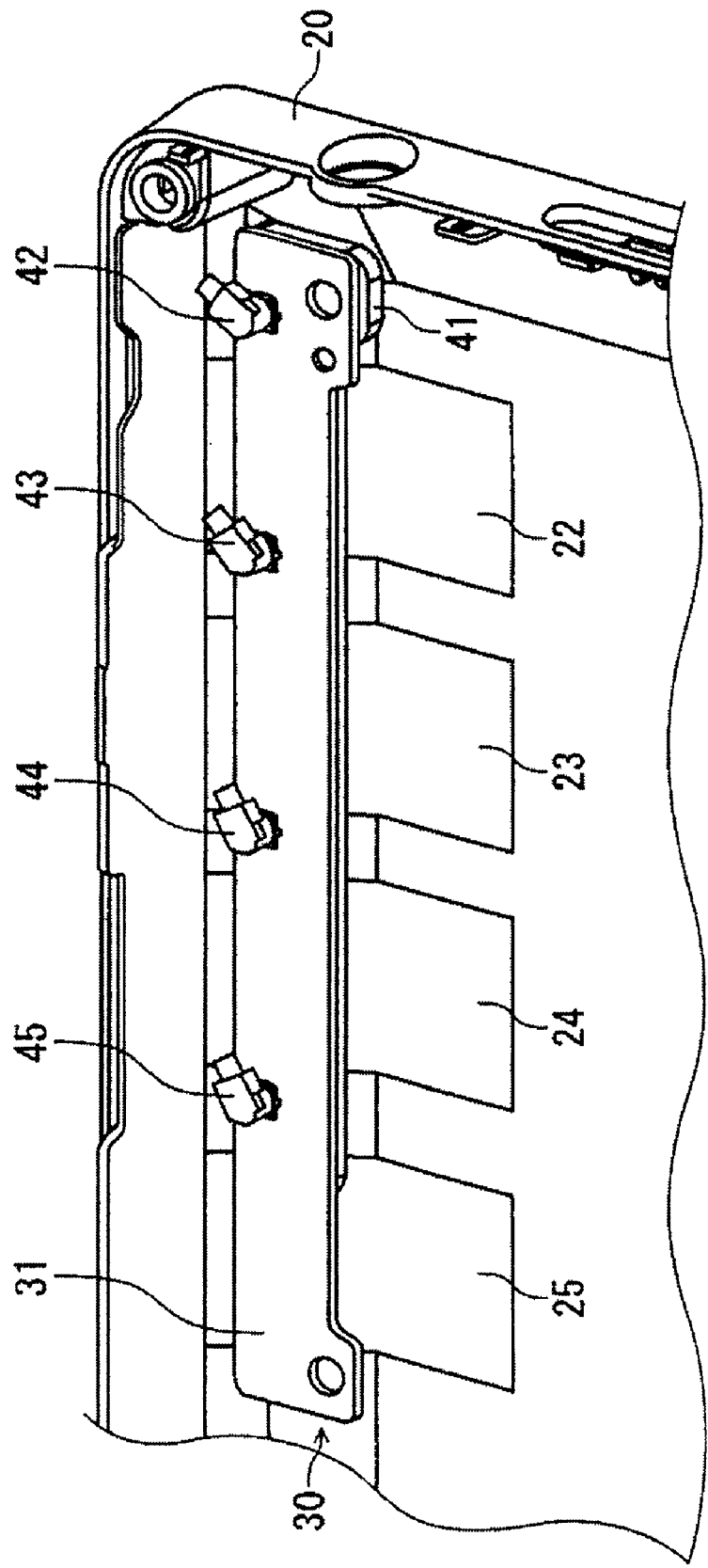

ELECTRONIC APPARATUS

CROSS-REFERENCE TO RELATED APPLICATIONS

This application is based upon and claims the benefit of priority from Japanese Patent Application No. 2007-339539, filed on Dec. 28, 2007, the entire contents of which are incorporated herein by reference.

BACKGROUND

1. Field

An aspect of the present invention relates to an electronic apparatus which takes into consideration the breaking off of a member in a housing.

2. Description of the Related Art

Various techniques have been proposed to prevent a connecting terminal (connector) from being erroneously pulled out of an external device in an electronic apparatus such as a personal computer (e.g., see JP-2005-50619-A for reference). With this type of techniques, the connector can be prevented from being unintentionally separated. Accordingly, it is convenient since the electronic apparatus can be used under the condition of vibration.

However, the conventional techniques are used only to prevent separation. The conventional techniques are not a technique for handling the case where the braking off occurs. Moreover, the conventional techniques relate to a connector between an electronic apparatus and an external device and can not handle the braking off of a member inside the electronic apparatus.

In the electronic apparatus, solder separation may occur by various causes such as shock or stress applied during handling. The member broken off by the solder separation rolls in a housing of the electronic apparatus. The broken-off member causes various types of internal breaking such as short-circuiting of a circuit in the electronic apparatus. Accordingly, it is important to handle the braking off of the member and limit the range in which the broken-off member freely moves.

Recently, smaller size portable electronic apparatuses have been developed, and thus small size electronic apparatuses having a size of A5 or less have been shown. For these small size electronic apparatuses, a size of a regulating member for limiting the moving range of the broken-off member should be reduced while reducing the entire size of the electronic apparatus.

In addition, as a technique which can be applied to small size electronic apparatuses, a technique for printing a wiring such as an antenna in a housing has been recently proposed. With this type of technique, a plurality of antennas can be formed in a housing in a single printing process.

However, depending on intended use of the electronic apparatuses, all of the antennas may not be used, but one or more antennas may be selectively used among the printed plurality of antennas.

As described above, in the case where the antenna to be used is different depending on intended use, it is necessary to selectively provide the antenna depending the intended use even if a member other than the antenna is in common use.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

FIG. 3 is an exemplary perspective view showing a portion of the second housing according to the first embodiment, in which a terminal part is provided to face an antenna group;

DETAILED DESCRIPTION

Various embodiments according to the present invention will be described hereinafter with reference to the accompanying drawings. In general, according to one embodiment of the present invention, there is provided an electronic apparatus including: a wiring that is formed on a mounting surface; a terminal that is electrically connected with the wiring; a terminal holder that is disposed above the mounting surface to face the wiring and that holds the terminal in a space between the terminal; and a blocking member that is disposed on the terminal holder at a side facing the mounting surface, that surrounds the terminal and that is separated from the mounting surface to regulate a gap between blocking member and the mounting surface so that the terminal is prevented from passing therethrough when the terminal is broken off from the terminal holder.

Embodiments of an electronic apparatus according to the invention will be described with reference to the accompanying drawings.

Figure 1:
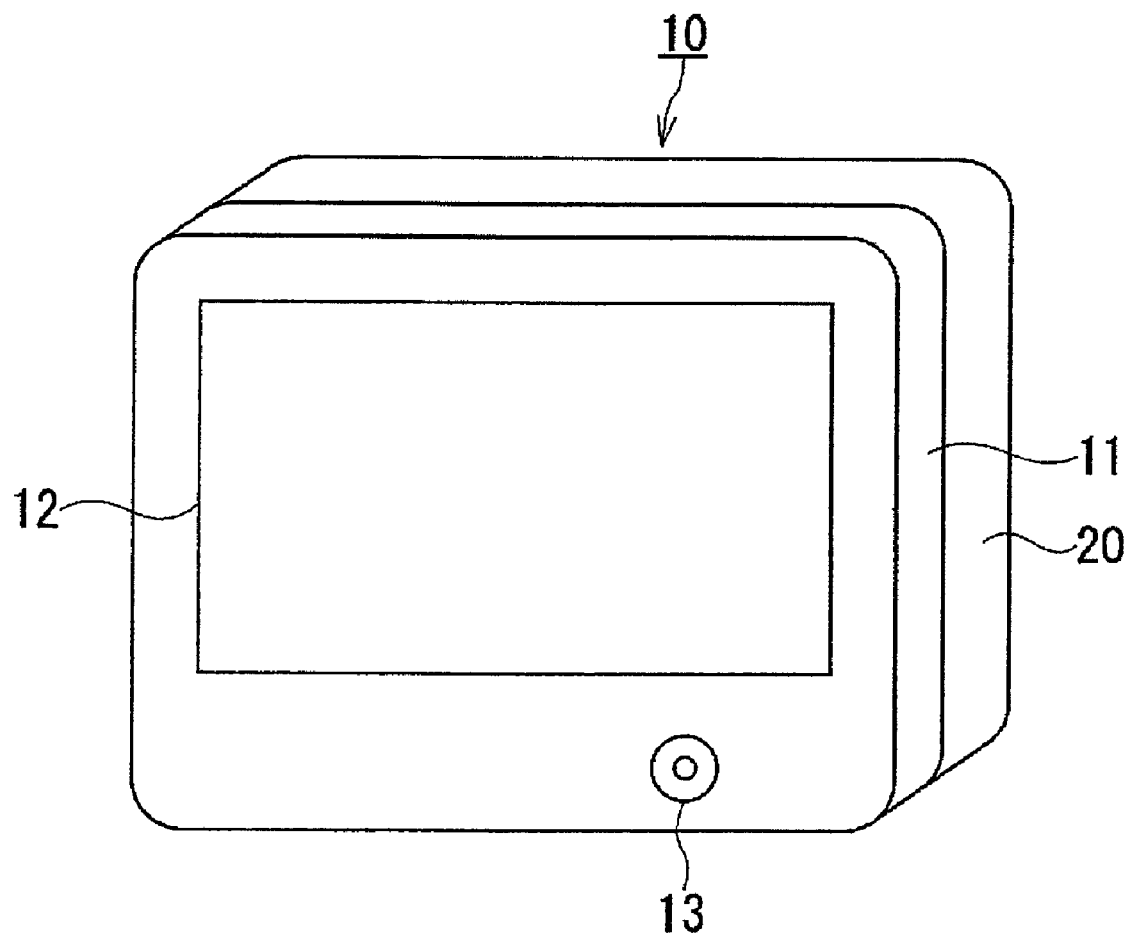
FIG. 1 is an exemplary view schematically showing an overall configuration of an electronic apparatus according to a first embodiment.

FIG. 1 is a view schematically showing an overall configuration of an electronic apparatus according to a first embodiment. Hereinafter, a small size personal computer is shown as an example of the electronic apparatus in the following description.

The electronic apparatus 10 includes a first housing 11 in which a system element is provided and a second housing 20 which is formed integrally with the first housing 11 and constitutes an outer frame of the electronic apparatus 10.

The first housing 11 includes an LCD 12 at a center portion thereof and an on/off button 13 at a side portion thereof. The display input part includes the LCD 12 as the display part and a pen tablet device or a touch panel as an input part.

Figure 2:
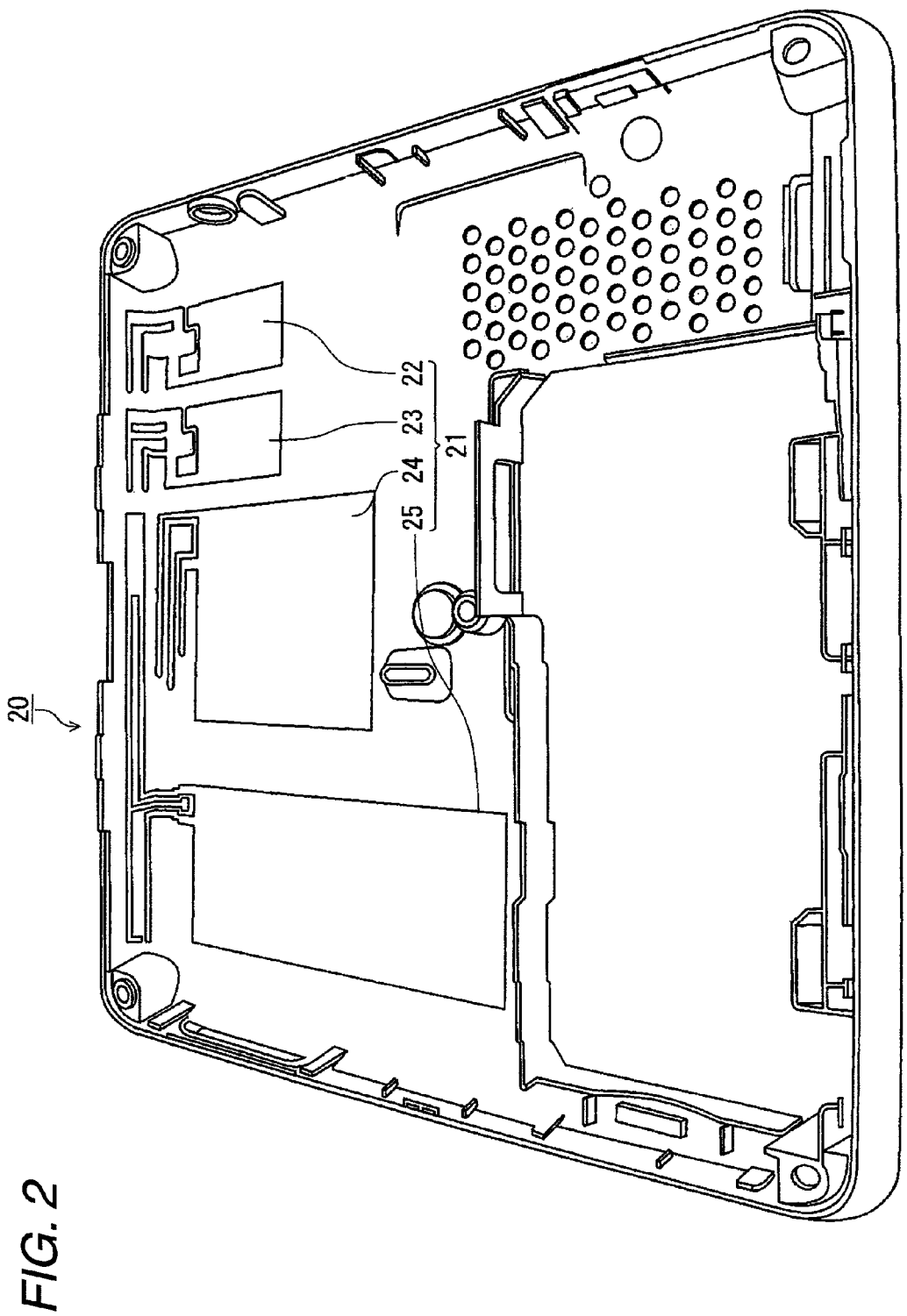
FIG. 2 is an exemplary perspective view showing an inner surface of a second housing.

FIG. 2 is a perspective view showing an inner surface of the second housing 20.

The second housing 20 includes an antenna group 21 as a plurality of wirings which are pattern-printed on the inner surface. Hereinafter, an example of the case where the antenna group 21 as the plurality of wirings has 4 antennas including first, second, third, and fourth antennas 22 to 25 as shown in FIG. 2 will be described in the following description.

It may not be necessary that the inner surface of the second housing 20 is a flat surface. As shown in FIG. 2, the inner surface may include a curved surface.

As shown in FIG. 2, each of the antennas 22 to 25 of the antenna group 21 has a given occupation area (pattern-printed area). They are printed to be separated from each other on the inner surface of the second housing 20 so that the occupation areas do not overlap with each other.

The first antenna 22 and the second antenna 23 are a diversity antenna for wireless LAN. The first antenna 22 functions as a main antenna and the second antenna 23 functions as an AUX antenna (sub-antenna).

The third antenna 24 is an antenna for GPS and the fourth antenna 25 functions as an antenna for transmitting and receiving with a portable cell phone.

The antenna group 21 may include an antenna used for another purpose or a multi-purpose antenna.

FIG. 3 is a perspective view showing a portion of the second housing 20 according to the first embodiment, in which a terminal part 30 is provided to face the antenna group 21.

Figure 4A:
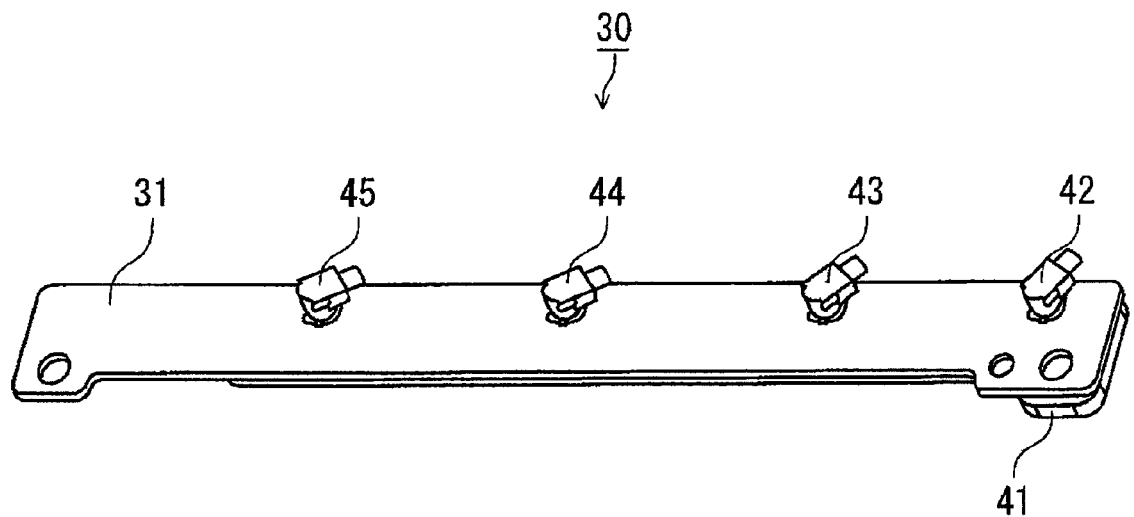
FIG. 4A is an exemplary perspective view showing a rear surface of an antenna facing surface of the terminal part according to the first embodiment and FIG. 4B is an exemplary perspective view showing the antenna facing surface of the terminal part according to the first embodiment.
Figure 4B:
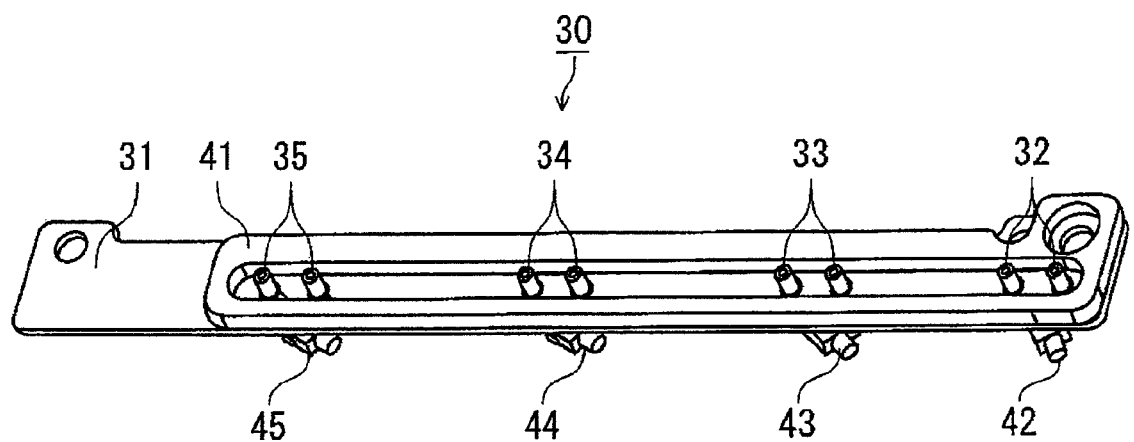

FIGS. 4A and 4B are perspective views of the terminal part 30 according to the first embodiment. FIG. 4A is a perspective view showing a rear surface of an antenna facing surface of the terminal part 30 and FIG. 4B is a perspective view showing the antenna facing surface of the terminal part 30.

As shown in FIGS. 4A and 4B, the terminal part 30 includes a terminal support substrate 31, first to fourth terminals 32 to 35, a protective part 41, and first to fourth cable connection parts 42 to 45. The terminal support substrate 31 is functioning as a terminal holder, and the protective part 41 is functioning as a blocking member.

The first to fourth terminals 32 to 35 are fixed by soldering on the surface of the terminal support substrate 31, which faces the second housing 20. The first to fourth terminals 32 to 35 are electrically connected to the first to fourth antennas 22 to 25, respectively, by being sandwiched and fixed between the terminal support substrate 31 and the inner surface of the second housing 20.

As shown in FIG. 4B, the protective part 41 is disposed on the surface of the terminal support substrate 31, which faces the second housing 20 so as to surround the periphery of the first to fourth terminals 32 to 35.

As shown in FIG. 3, a height of the protective part 41 from the terminal support substrate 31 is set so that the protective part 41 and the second housing 20 are separated from each other and that the protective part 41 is not brought into contact with the antenna group 21. The reason is that characteristics of the antennas are changed when a substance other than the first to fourth terminals 32 to 35 is brought into contact with the antennas. The characteristics of the antennas are affected even by metal near the antennas. Therefore, the protective part 41 is made of a nonmetallic material such as polycarbonate so that the characteristics of the antennas are not affected.

The terminal support substrate 31 and the protective part 41 are configured so that the first to fourth terminals 32 to 35 do not pass through a gap between the protective part 41 and the inner surface of the second housing 20.

The first to fourth cable connection parts 42 to 45 are disposed to face the first to fourth contact terminals 32 to 35, respectively, with the terminal support substrate 31 disposed therebetween, and are electrically connected to the first to fourth terminals 32 to 35, respectively. The first to fourth cable connection parts 42 to 45 can be connected to cables (conductive wires or the like). Each of the antennas 22 to 25 can be electrically connected to a wireless module by connecting one end of a cable to each of the first to fourth cable connection parts 42 to 45 and connecting the other end of the cable to the wireless module.

Next, an example of an operation of the electronic apparatus 10 according to the first embodiment will be described.

Figure 5:
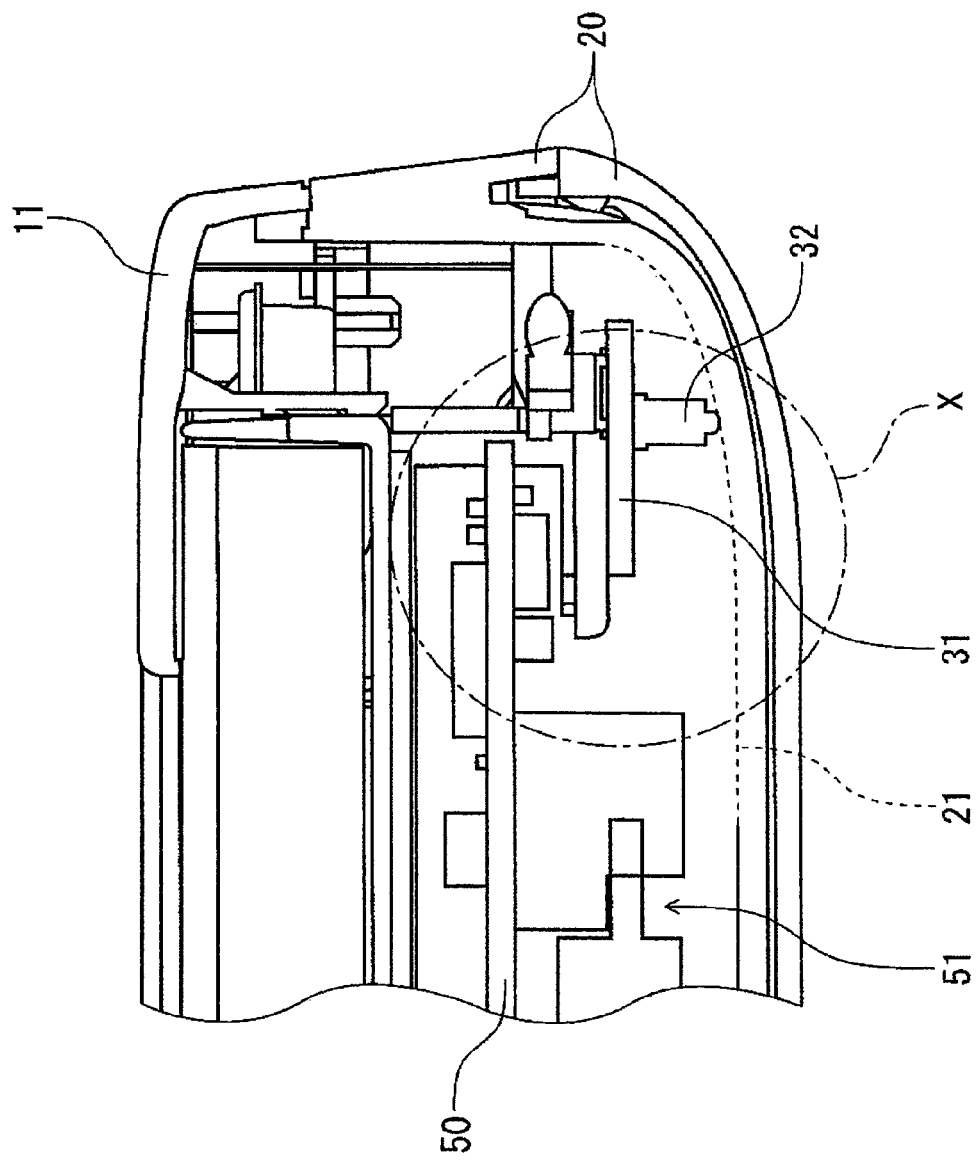
FIG. 5 is an exemplary side view showing an interior configuration of the partially cut electronic apparatus without a protective part.
Figure 6:
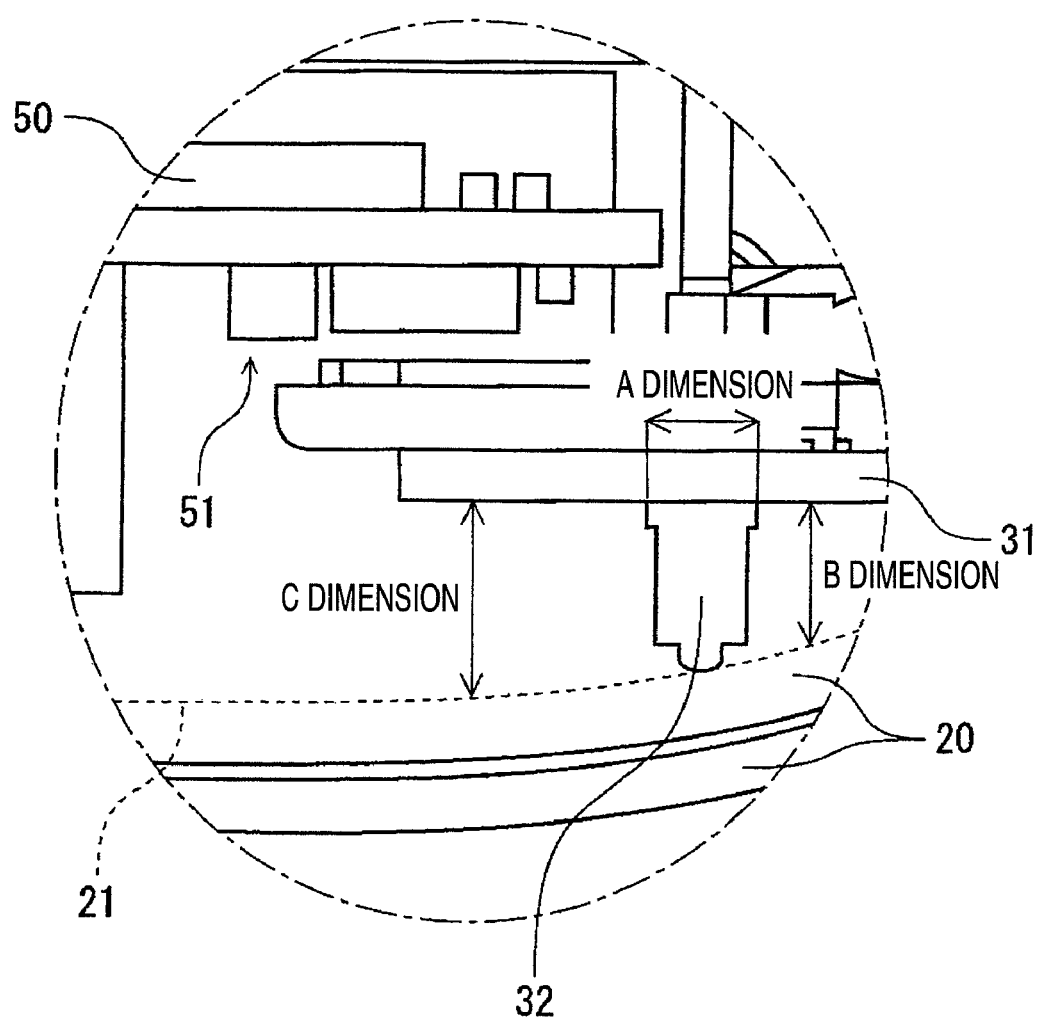
FIG. 6 is an exemplary enlarged view of an X part of FIG. 5.

FIG. 5 is a side view showing an interior configuration of a partially cut electronic apparatus 100 without the protective part 41 and FIG. 6 is an enlarged view of an X part of FIG. 5. In FIGS. 5 and 6, a broken line indicates a position on the inner surface of the second housing 20, on which the antenna group 21 is printed.

The first to fourth terminals 32 to 35 may be broken off by solder separation occurring by various causes such as shock or stress applied during handling. In this case, as shown in FIG. 6, when a gap between the terminal support substrate 31 and the second housing 20 (see a B dimension and a C dimension of FIG. 6 for reference) is larger than a width of the terminal indicated by an A dimension, the broken-off terminal rolls in the electronic apparatus 100. For example, when the terminal rolls to the system element 51, such as a main substrate 50, the terminal causes malfunction of the system element 51 by short-circuiting.

If the range in which a broken-off member freely moves can be limited, the member such as the broken-off terminal can be prevented from rolling in the inner portion. As a method of limiting the range in which the broken-off member freely moves, a method is considered of providing a member for spatially separating a position in which a member having a high possibility of solder separation is disposed from a position of a main board or the like in which a problem occurs when the broken-off member freely moves to the main board or the like, thereby limiting the moving range by the movement prevention member.

Figure 7:
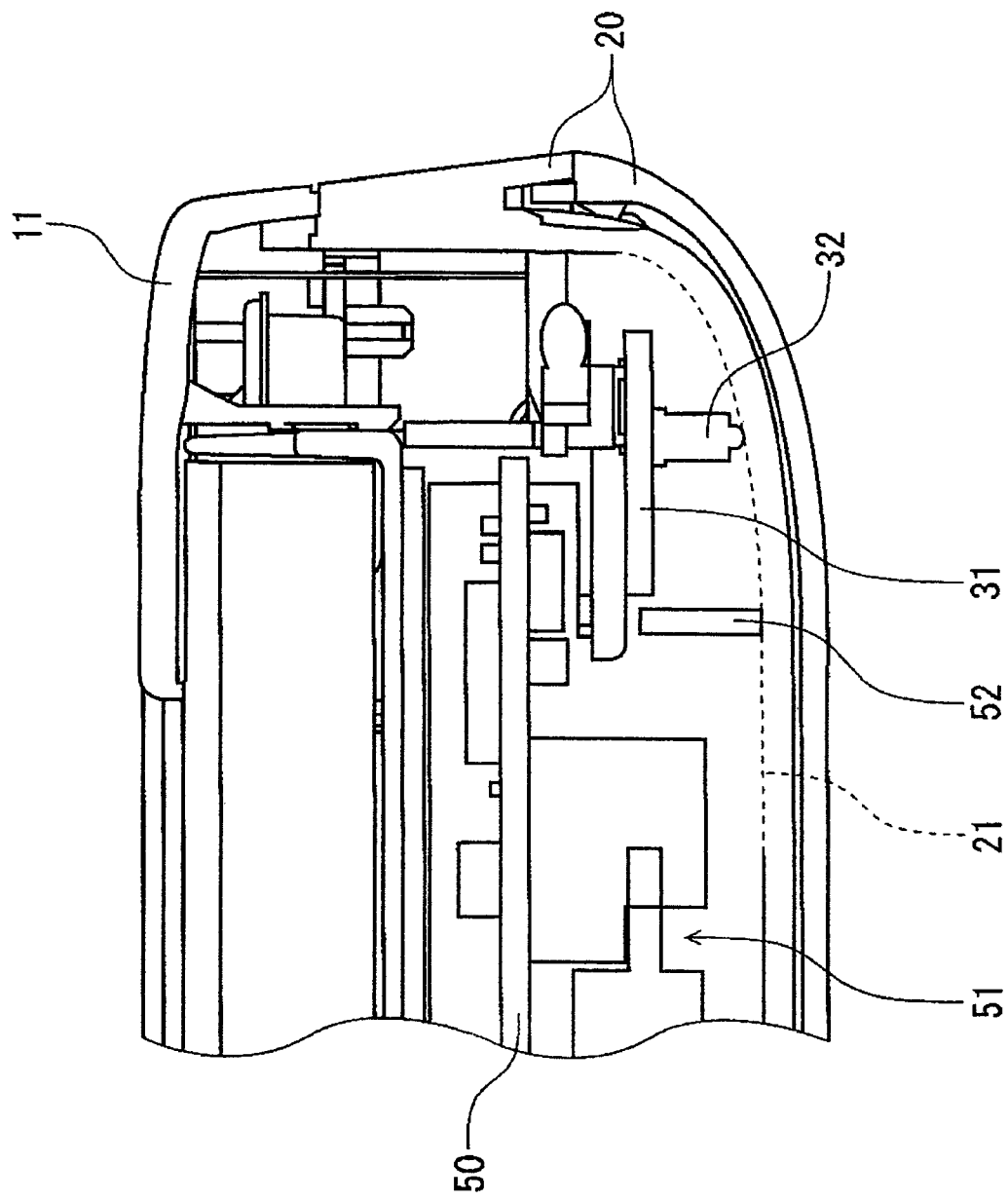
FIG. 7 is an exemplary side view showing an interior configuration of the partially cut electronic apparatus in which a separation plate for terminals broken off from the inner portion of the electronic apparatus is provided on the inner surface of the second housing.

FIG. 7 is a side view showing an interior configuration of an example of the partially cut electronic apparatus 100 in which a separation plate 52 for separating the terminals from the inner portion of the electronic apparatus 100 is provided on the inner surface of the second housing 20. In FIG. 7, a broken line indicates a position on the inner surface of the second housing 20, on which the antenna group 21 is printed.

The broken-off terminal can be prevented from rolling in the electronic apparatus 100 by providing the separation plate 52 at a position shown in FIG. 7. However, the separation plate 52 shown in FIG. 7 is provided in the area in which the antenna group 21 is printed. For this reason, this separation plate 52 becomes the obstruction for forming the antenna group 21.

Figure 8:
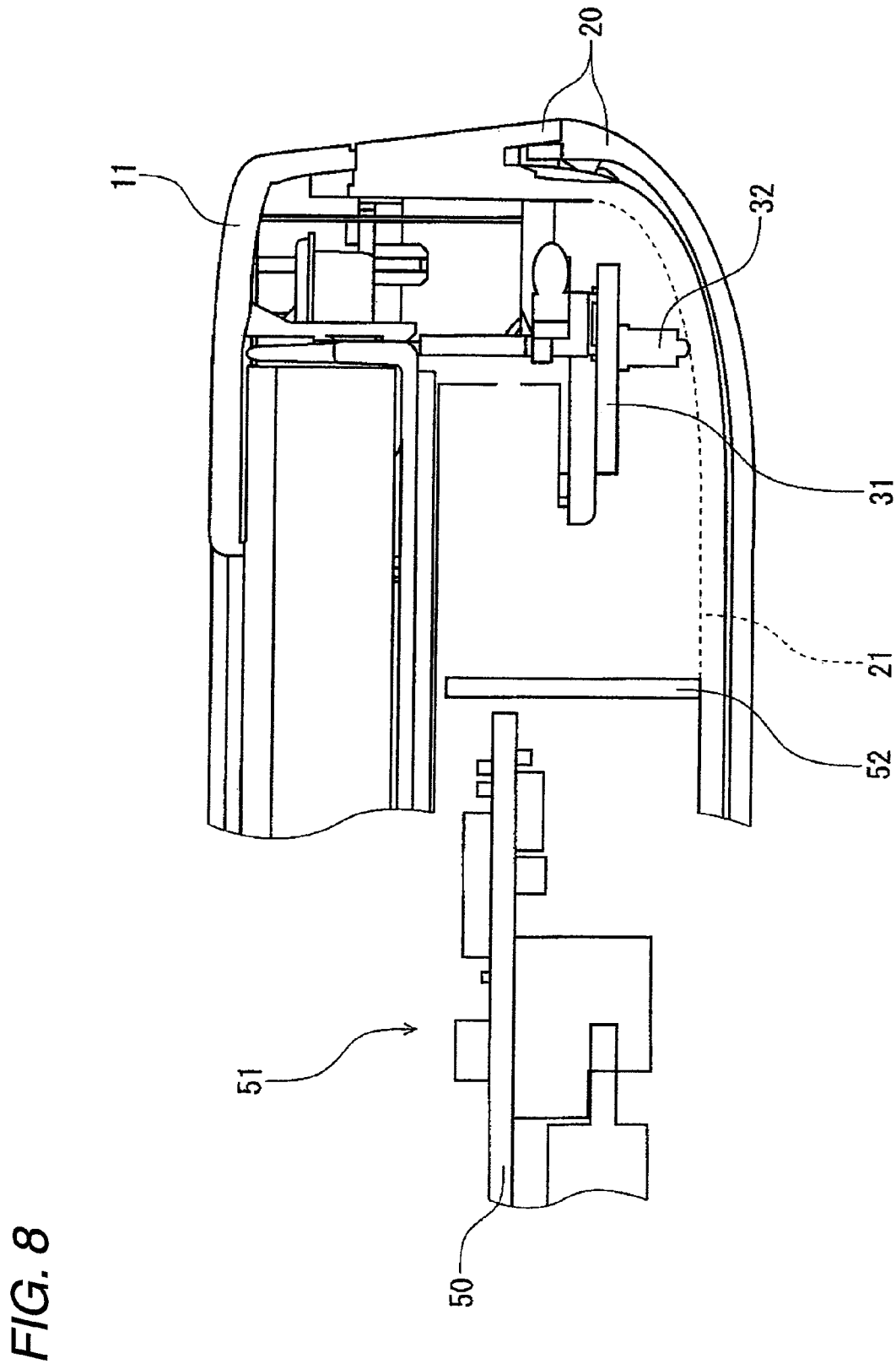
FIG. 8 is an exemplary side view showing an interior configuration of the partially cut electronic apparatus in which the separation plate for separating the terminals from the inner portion of the electronic apparatus is provided on the inner surface of the second housing.

FIG. 8 is a side view showing an interior configuration of another example of the partially cut electronic apparatus 100 in which the separation plate 52 for separating the terminals from the inner portion of the electronic apparatus 100 is provided on the inner surface of the second housing 20. In FIG. 8, a broken line indicates a position on the inner surface of the second housing 20, on which the antenna group 21 is printed.

The electronic apparatus 100 shown in FIG. 8 is different from the electronic apparatus 100 shown in FIG. 7 in that the separation plate 52 is provided at a position in which the antenna group 21 is not printed. If the separation plate 52 is provided as shown in FIG. 8, the antenna group 21 can be printed. However, it is necessary that the system element 51 is moved so as not to overlap with the separation plate 52, and thus the entire size of the electronic apparatus 100 increases. Accordingly, it is difficult that the method of providing the separation plate 52 as shown in FIG. 8 is used for small size apparatuses.

Figure 9:
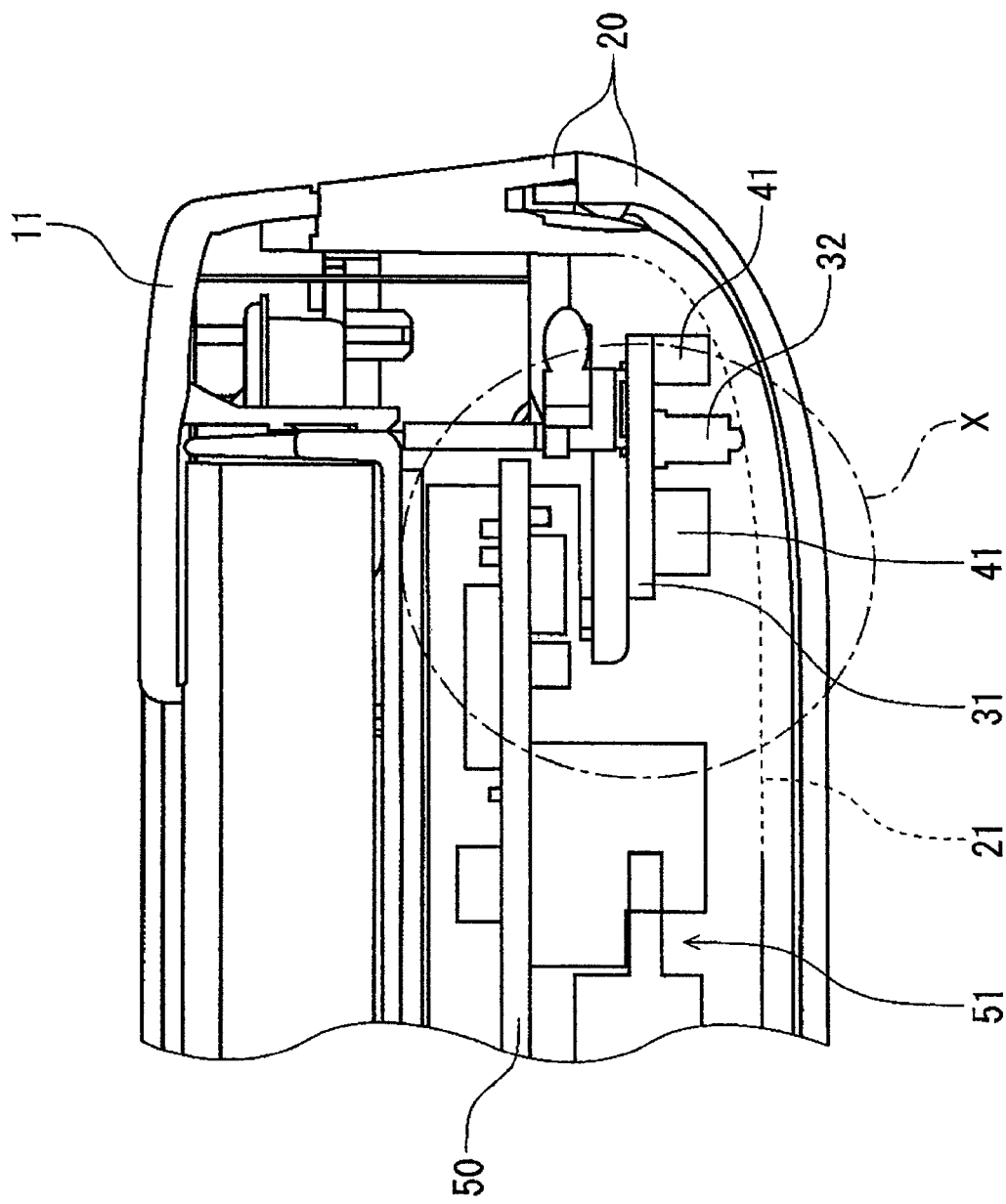
FIG. 9 is an exemplary side view showing an interior configuration of the partially cut electronic apparatus with the protective part according to the first embodiment.
Figure 10:
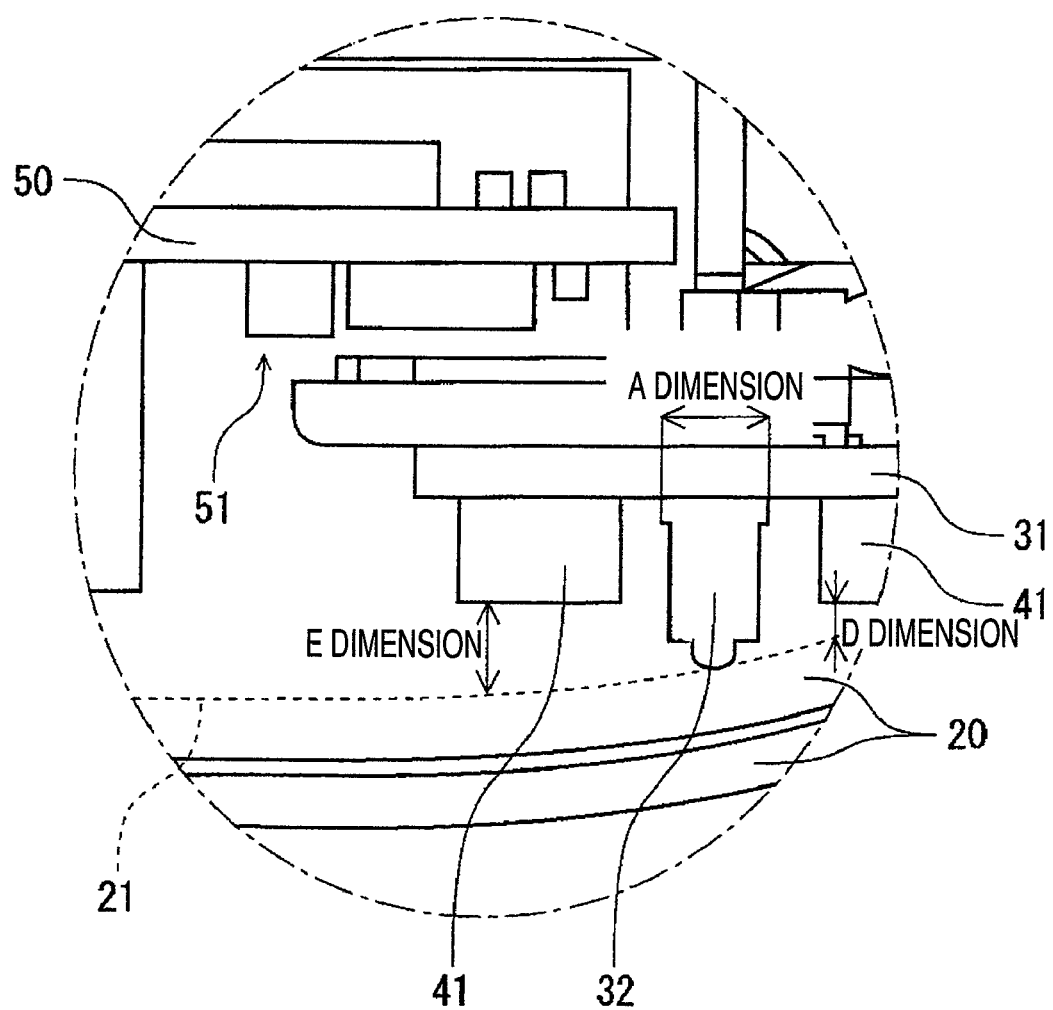
FIG. 10 is an exemplary enlarged view of an X part of FIG. 9.

FIG. 9 is a side view showing an interior configuration of an example of the partially cut electronic apparatus 10 with the protective part 41 according to the first embodiment and FIG. 10 is an enlarged view of an X part of FIG. 9. In FIGS. 9 and 10, a broken line indicates a position on the inner surface of the second housing 20, on which the antenna group 21 is printed.

As shown in FIG. 10, when a gap between the terminal support substrate 31 and the second housing 20 (see a D dimension and an E dimension of FIG. 10 for reference) is larger than a width of the terminal indicated by an A dimension, the broken-off terminal freely moves in the range surrounded by the protective part 41.

Accordingly, in the case where a member is broken off in the electronic apparatus 10, for example, by the solder separation, the broken-off member can be isolated from the system element 51 in the electronic apparatus 10 according to this embodiment. Therefore, in the case where the member is broken off in the electronic apparatus 10, internal breaking occurring by the member can be prevented.

In the electronic apparatus 10 according to this embodiment, the protective part 41 can be provided without moving the system element. Accordingly, in the electronic apparatus 10 according to this embodiment, the range in which the broken-off member freely moves can be limited while the small entire size of the electronic apparatus 10 is maintained.

In addition, in the electronic apparatus 10 according to this embodiment, the protective part 41 for the broken-off terminal is disposed on the terminal support substrate 31 so as to be disposed away from and not to be brought into contact with the antenna group 21, and is made of a nonmetallic material. Accordingly, the protective part 41 can be disposed without affecting the characteristics of the antennas of the antenna group 21.

Figure 11:
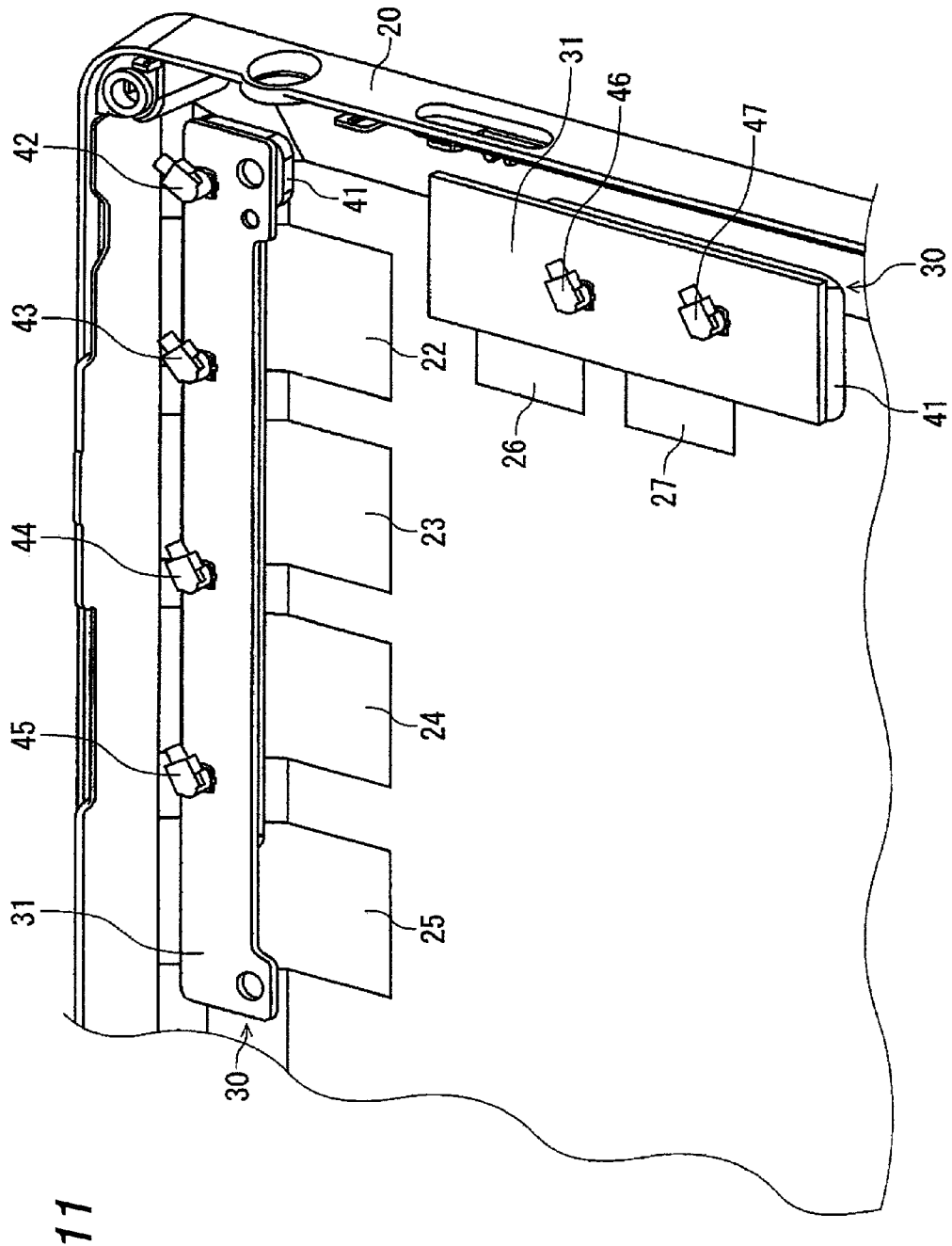
FIG. 11 is an exemplary perspective view showing a first variant of the first embodiment.

FIG. 11 is a perspective view showing a first variant of the terminal part 30 shown in FIG. 3.

The first variant of the terminal part 30 includes an example of the case where the electronic apparatus 10 according to the first embodiment includes a plurality of terminal parts 30.

The antennas of the pattern-printed antenna group 21 may be arranged in a plurality of lines. FIG. 11 shows an example of the case where the antenna group 21 further includes a fifth antenna 26 and a sixth antenna 27 and the fifth antenna 26 and the sixth antenna 27 are not arranged in a line in which the first to fourth antennas 22 to 25 are provided.

In this case, as shown in FIG. 11, another terminal part 30 may be provided so as to correspond to each of the lines in which the antennas are provided. The terminal part 30 which is provided to face the fifth and sixth antennas 26 and 27, includes a terminal support substrate 31, a fifth and sixth terminals 36 and 37, a protective part 41, and fifth and sixth cable connection parts 46 and 47. The fifth and sixth terminals 36 and 37 are electrically connected to the fifth and sixth antennas 26 and 27 as the first to fourth terminals 32 to 35.

The plurality of terminal parts 30 may be used for the antennas in the same line. For example, a terminal part 30 corresponding to the first and second antennas 22 and 23 and a terminal part 30 corresponding to the third and fourth antennas 24 and 25 may be independently provided as the above terminal parts 30.

Figure 12:
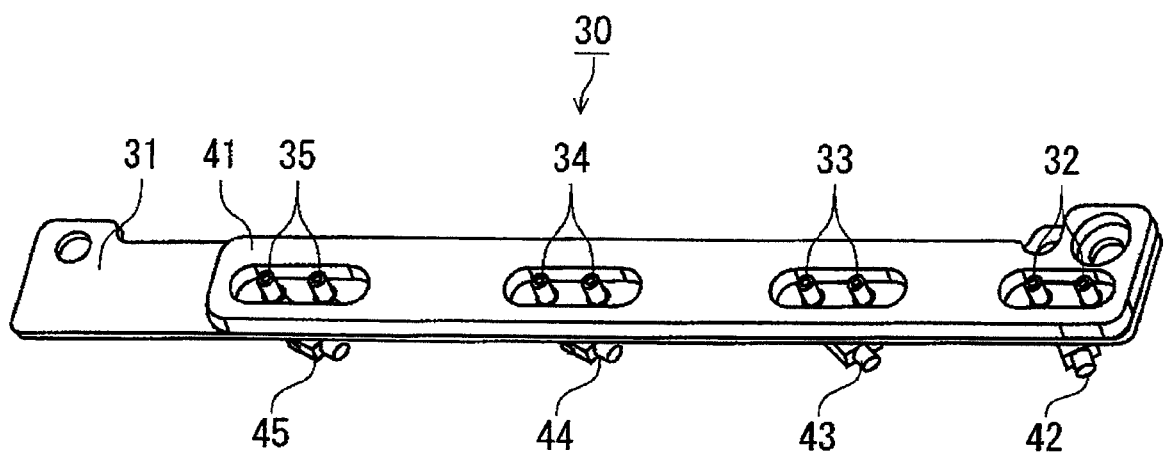
FIG. 12 is an exemplary perspective view showing an antenna facing surface of a second variant of the first embodiment of the terminal part shown in FIG. 3.

FIG. 12 is a perspective view showing an antenna facing surface of a second variant of the terminal part 30 shown in FIG. 3.

The second variant of the terminal part 30 is an example of the case where the protective part 41 is shaped to surround each of the peripheries of the first to fourth terminals 32 to 35. As shown in FIG. 12, the range in which the broken-off terminal freely moves can be further limited by surrounding each of the peripheries of the terminals 32 to 35 by the protective part 41.

With the shape of the protective part 41 shown in FIG. 4B, the broken-off terminal can be prevented from moving to the inner portion of the electronic apparatus 10. However, the antennas (the other antennas) other than the antenna corresponding to the broken-off terminal are affected. For example, when the first terminal 32 is broken off, the first terminal 32 rolls to the second to fourth antennas 23 to 25 and changes the characteristics of the antennas 23 to 25.

Meanwhile, with the shape of the protective part 41 shown in FIG. 12, the broken-off terminal can not move to the other antennas. Therefore, an effect of the broken-off terminal on the other antennas is minimized.

For example, even when the first terminal 32 is broken off, the second to fourth antennas 23 to 25 can be used in the same manner as that before the first terminal 32 is broken off. If the first antenna 22 and the second antenna 23 are a diversity antenna, a function of the second antenna 23 is good even when a function of the first antenna 22 is lost by the braking off of the first terminal 32. Consequently, the electronic apparatus 10 can continuously use a function of wireless LAN.

Next, the electronic apparatus 10 according to a second embodiment will be described.

The electronic apparatus 10 according to this embodiment is used for the case where a part of the antennas of the antenna group 21 may be used, and is different from the electronic apparatus 10 according to the first embodiment in that the shape of the terminal part 30 can be reduced in size to follow the some antennas. By reducing the shape of the terminal part 30 in size, a mounting space or the like of the system element 51, such as the main substrate 50, can be increased.

Figure 13:
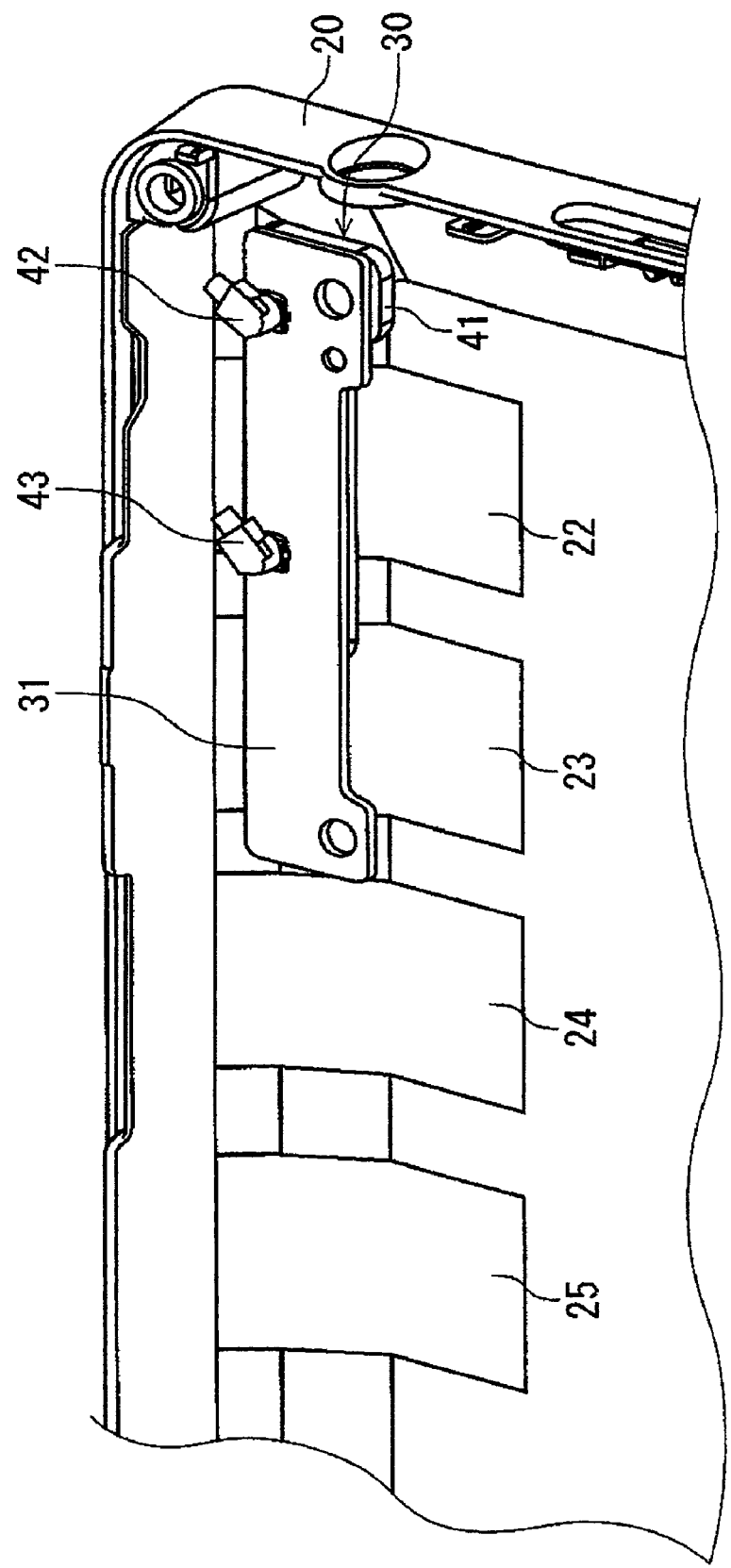
FIG. 13 is an exemplary perspective view showing a portion of the second housing according to the second embodiment, in which a terminal part is provided to face the antenna group.

FIG. 13 is a perspective view showing a portion of the second housing 20 according to the second embodiment in which the terminal part 30 is provided to face the antenna group 21.

Figure 14A:
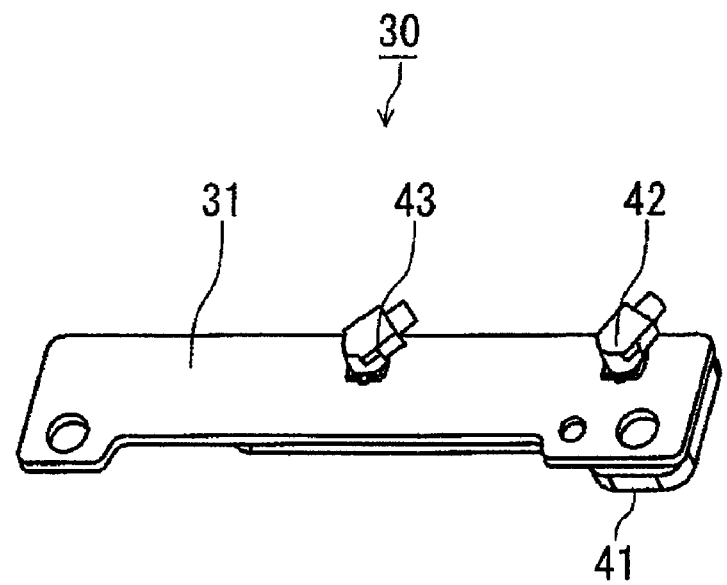
FIG. 14A is an exemplary perspective view showing the rear surface of the antenna facing surface of the terminal part according to the second embodiment and FIG. 14B is an exemplary perspective view showing the antenna facing surface of the terminal part according to the second embodiment.
Figure 14B:
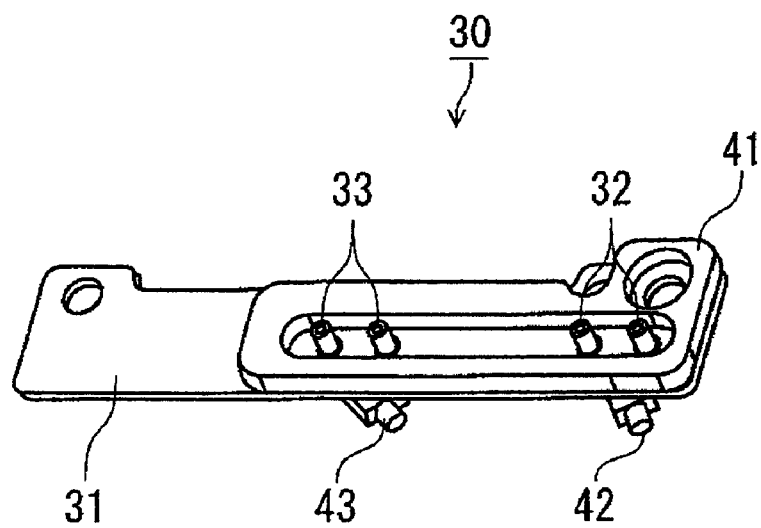

In addition, FIGS. 14A and 14B are perspective views of the terminal part 30 according to the second embodiment. FIG. 14A is a perspective view showing the rear surface of the antenna facing surface of the terminal part 30 according to the second embodiment, and FIG. 14B is a perspective view showing the antenna facing surface of the terminal part 30 according to the second embodiment.

The antenna group 21 can be formed by printing all of the antennas 22 to 25 in a single process. Therefore, the entire antenna group 21 is collectively printed for an effective manufacturing even when an antenna to not be used in the electronic apparatus 10 is included therein.

FIG. 13 and FIGS. 14A and 14B show an example of the case where the third antenna 24 as an antenna for GPS and the fourth antenna 25 as an antenna for transmitting and receiving with a portable cell phone are unnecessary in view of the intended use of the electronic apparatus 10.

In this case, the third and fourth terminals 34 and 35 and the third and fourth cable connection parts 44 and 45 corresponding to the third and fourth antennas 24 and 25 are an unnecessary member. Therefore, only the first and second terminals 32 and 33 corresponding to the first and second antennas 22 and 23 are necessary among the first to fourth terminals 32 to 35.

Accordingly, as shown in FIG. 13 and FIGS. 14A and 14B, the terminal support substrate 31 and the protective part 41 are configured so as to have a given dimension necessary for providing the first and second terminals 32 and 33 and for facing the inner surface of the second housing 20. The dimension necessary for facing the inner surface of the second housing 20 means a dimension including an area necessary for providing a screw hole and the like for the case where, for example, fastening is performed for the facing operation.

As a result, a space is formed above the third and fourth antennas 24 and 25. Since the third and fourth antennas 24 and 25 are not substantially used, this space can be used as the mounting space of the system element 51, such as the main substrate 50.

The electronic apparatus 10 according to this embodiment also has the same effect as the electronic apparatus 10 according to the first embodiment. In addition, in the electronic apparatus 10 according to the second embodiment, the shape of the terminal part 30 can be more reduced in size than that in the electronic apparatus 10 according to the first embodiment. Accordingly, in the electronic apparatus 10 according to the second embodiment, the space for mounting another interior device can be increased.

Figure 15:
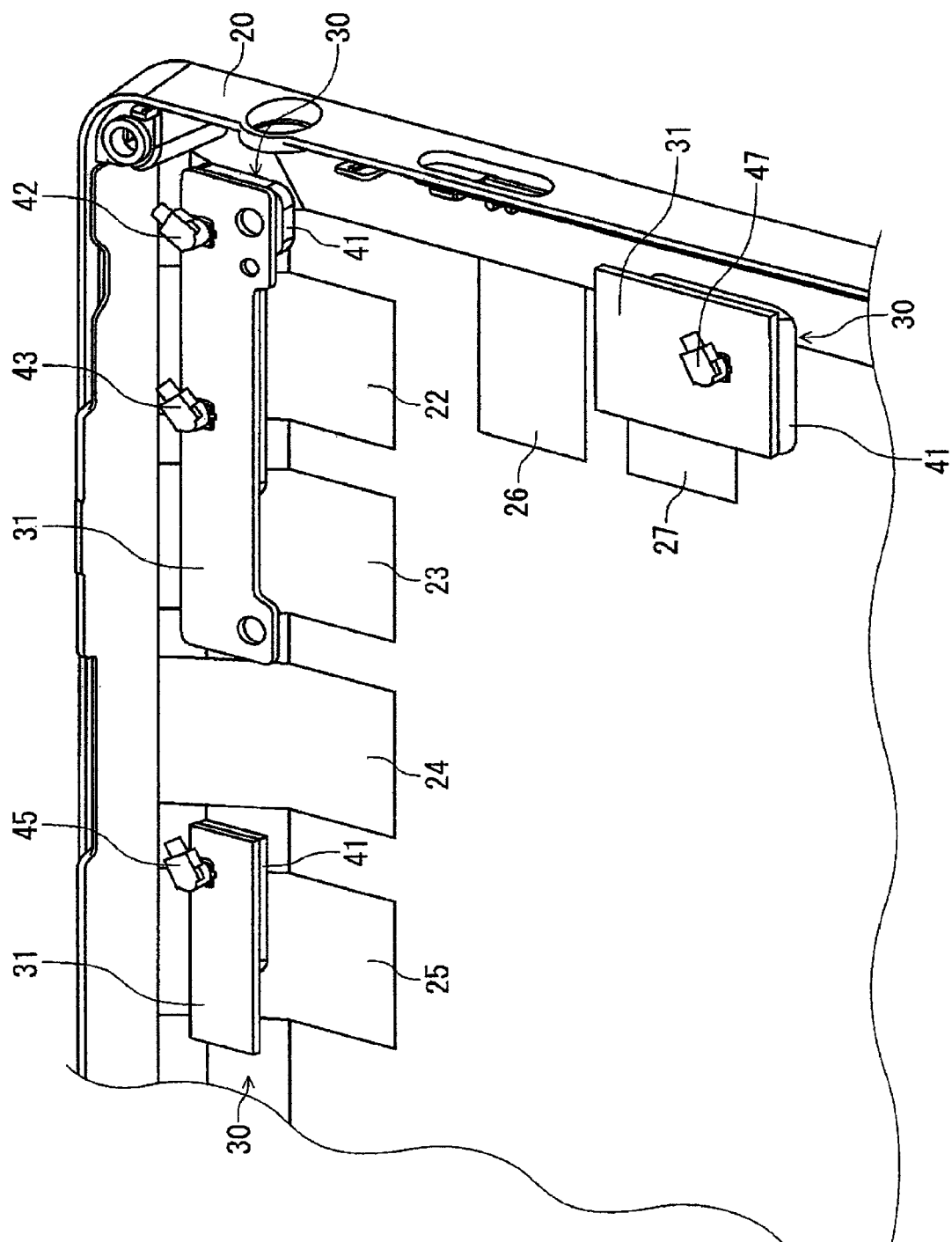
FIG. 15 is an exemplary perspective view showing a first variant of the second embodiment of the terminal part shown in FIG. 13.

FIG. 15 is a perspective view showing a first variant of the terminal part 30 shown in FIG. 13.

The first variant of the terminal part 30 is an example of the case where the electronic apparatus 10 according to the second embodiment includes the plurality of terminal parts 30.

In the variant of the terminal parts 30 shown in FIG. 15, the terminals corresponding to the unnecessary antennas are not provided in comparison with the first variant of the terminal part 30 according to the first embodiment shown in FIG. 11. Accordingly, a space for mounting another interior device can be increased.

FIG. 15 shows an example of the case where the third antenna 24 as an antenna for GPS and the fifth antenna 26 are unnecessary in view of the intended use of the electronic apparatus 10.

Figure 16:
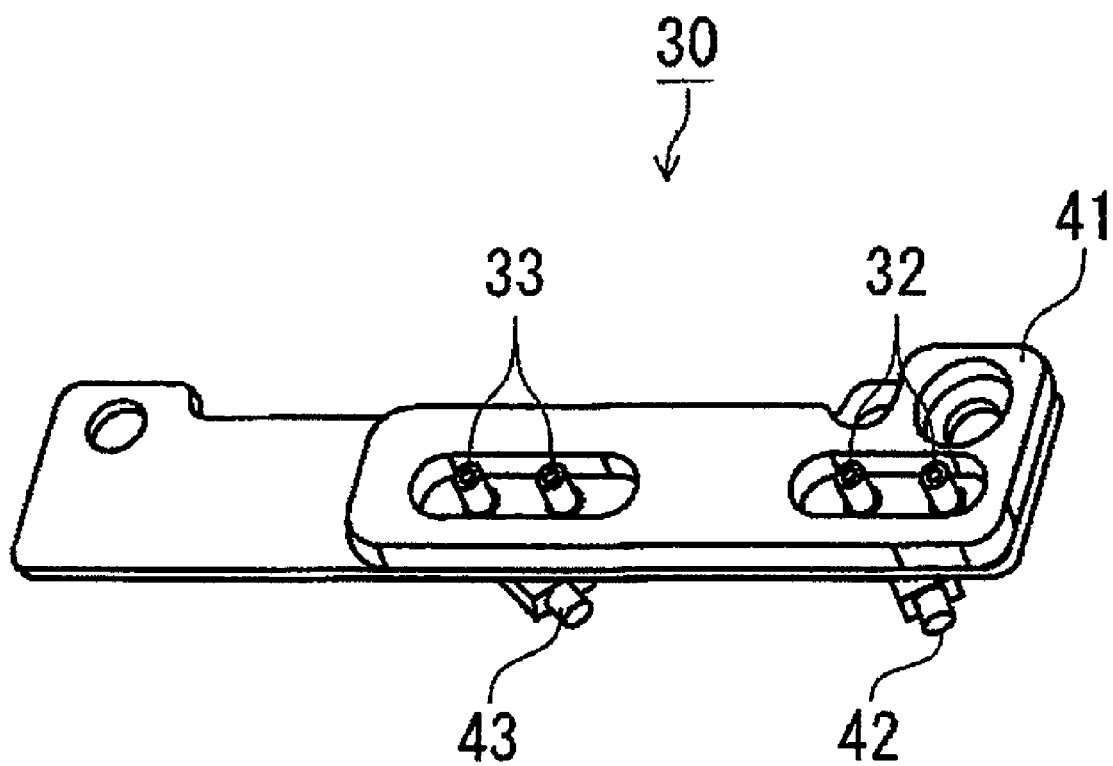
FIG. 16 is an exemplary perspective view showing the antenna facing surface of a second variant of the second embodiment of the terminal part shown in FIG. 13.

FIG. 16 is a perspective view showing the antenna facing surface of a second variant of the terminal part 30 shown in FIG. 13.

When the protective part 41 according to this embodiment has a shape surrounding each of the peripheries of the terminals as in the case of the second variant of the terminal part 30 according to the first embodiment shown in FIG. 12, the range in which the broken-off terminal freely moves can be further limited in comparison with the case where the protective part 41 having the shape shown in FIG. 14B is used.

The invention is not limited to the above-described embodiments and can be embodied by changing the constituting elements without departing from the scope and spirit of the invention in execution. Various types of the invention can be formed by properly combining the plurality of constituting elements disclosed in the embodiments. For example, some constituting elements may be removed from all of the constituting elements disclosed in the embodiments. In addition, different constituting elements may be properly combined according to a different embodiment.

According to an aspect of the present invention, when a member is broken off by solder separation due to shock or stress applied during handling, the range in which a member freely moves in a housing can be limited. In addition, in the case where a plurality of wirings are printed in the housing, a position of a terminal for connecting each of the wirings to a main body of the electronic apparatus can be changed depending on intended use.

What is claimed is:

1. An electronic apparatus comprising:
a wiring formed on a mounting surface;
a terminal electrically connected with the wiring;
a terminal holder above the mounting surface facing the wiring configured to hold the terminal in a space between the terminal holder and the mounting surface; and
a separator on the terminal holder facing the mounting surface, surrounding the terminal, and separated from the mounting surface to adjust a space between the separator and the mounting surface so that the terminal is prevented from passing through the space when the terminal comes off from the terminal holder.

2. The electronic apparatus of claim 1,
wherein the wiring comprises a plurality of wirings, each wiring being separated from one another, and
wherein the terminal comprises a plurality of terminals, each terminal being connected with a corresponding one of the plurality of wirings.

3. The electronic apparatus of claim 2,
wherein the terminal holder comprises a plurality of the terminal holders.

4. The electronic apparatus of claim 2,
wherein the separator is configured to surround peripheries of each of the plurality of the terminals.

5. The electronic apparatus of claim 1 further comprising:
a housing,
wherein the mounting surface comprises an inner surface of the housing, and
wherein the wiring comprises an antenna pattern-printed along the mounting surface.

6. An electronic apparatus comprising:
a housing that comprises a mounting surface at an inner surface of the housing;
a first wiring formed on the mounting surface;
a second wiring formed on the mounting surface, and separated from the first wiring;

a terminal electrically connected with the first wiring so as to make only the first wiring functional; and a terminal holder above the mounting surface facing the first wiring configured to hold the terminal.

7. The electronic apparatus of claim 6, wherein the first wiring comprises a plurality of first wirings, wherein the terminal comprises a plurality of terminals each connected with a corresponding one of the plurality of first wirings to make each of the plurality of wirings functional, and wherein the terminal holder comprises a plurality of the terminal holders.

8. The electronic apparatus of claim 6, further comprising:

a separator on the terminal holder facing the mounting surface, surrounding the terminal and separated from the mounting surface to adjust a space between the separator and the mounting surface so that the terminal is prevented from passing through the space when the terminal comes off from the terminal holder.

9. The electronic apparatus of claim 8, wherein the first wiring comprises a plurality of first wirings, wherein the terminal comprises a plurality of terminals each connected with a corresponding one of the plurality of first wirings to make each of the plurality of wirings functional, and wherein the separator is configured to surround peripheries of each of the plurality of the terminals.

10. The electronic apparatus of claim 6, wherein the first wiring and the second wiring comprise an antenna pattern-printed along the mounting surface.

* * * * *